(12) United States Patent
Aiba et al.

(10) Patent No.: US 10,711,844 B2
(45) Date of Patent: Jul. 14, 2020

(54) ASSEMBLY OF SHAFT AND YOKE

(71) Applicant: YAMADA MANUFACTURING CO., LTD., Kiryu-shi, Gunma (JP)

(72) Inventors: Takuya Aiba, Kiryu (JP); Toru Sekiguchi, Kiryu (JP); Koji Hirooka, Kiryu (JP)

(73) Assignee: YAMADA MANUFACTURING CO., LTD., Kiryu-Shi (JP)

( * ) Notice: Subject to any disclaimer, the term of this patent is extended or adjusted under 35 U.S.C. 154(b) by 315 days.

(21) Appl. No.: 15/876,862

(22) Filed: Jan. 22, 2018

(65) Prior Publication Data
US 2018/0223910 A1 Aug. 9, 2018

(30) Foreign Application Priority Data
Feb. 6, 2017 (JP) .................. 2017-019815

(51) Int. Cl.
*F16D 1/08* (2006.01)
*F16D 3/38* (2006.01)
*B62D 1/16* (2006.01)
*F16C 3/02* (2006.01)
*B62D 1/20* (2006.01)
*F16D 1/10* (2006.01)

(52) U.S. Cl.
CPC .............. *F16D 3/387* (2013.01); *B62D 1/16* (2013.01); *B62D 1/20* (2013.01); *F16C 3/02* (2013.01); *F16D 1/0858* (2013.01); *F16C 2204/20* (2013.01); *F16C 2226/52* (2013.01); *F16C 2226/80* (2013.01); *F16D 2001/102* (2013.01); *F16D 2001/103* (2013.01)

(58) Field of Classification Search
CPC .. F16D 3/387; F16D 1/0858; F16D 2001/103; F16D 2001/102; B62D 1/20; B62D 1/16; B62D 1/185; F16C 3/02; F16C 2204/20; F16C 2226/80; F16C 2226/52; F16C 3/023
USPC ................................... 464/134, 182
See application file for complete search history.

(56) References Cited

U.S. PATENT DOCUMENTS

| | | | | |
|---|---|---|---|---|
| 6,517,278 B2 * | 2/2003 | Moulinet | ................ | F16D 1/072 464/182 |
| 2008/0096677 A1 * | 4/2008 | Kurzeja | .................. | F16D 1/068 464/134 |
| 2015/0330457 A1 * | 11/2015 | Koiso | ...................... | F16D 1/068 |

FOREIGN PATENT DOCUMENTS

JP 03-248727 11/1991

* cited by examiner

*Primary Examiner* — Greg Binda
(74) *Attorney, Agent, or Firm* — Rankin, Hill & Clark LLP

(57) ABSTRACT

A yoke has a yoke main body portion and a thin portion. The thin portion extends from the yoke main body portion toward the shaft, and is thinner than the yoke main body portion. The front end of the shaft is a large-diameter portion that has a larger diameter than an adjacent portion. The yoke main body portion has a yoke general-diameter portion and a step portion. The yoke general-diameter portion has an inner diameter that is substantially equal to an outer diameter of the large-diameter portion. The step portion extends from an end of the yoke general-diameter portion toward an axial line, and has an inner diameter smaller than the outer diameter of the large-diameter portion. The step portion abuts a front end of the large-diameter portion. The thin portion has reduced-radius portions that have smaller radii than the outer radius of the large-diameter portion.

5 Claims, 8 Drawing Sheets

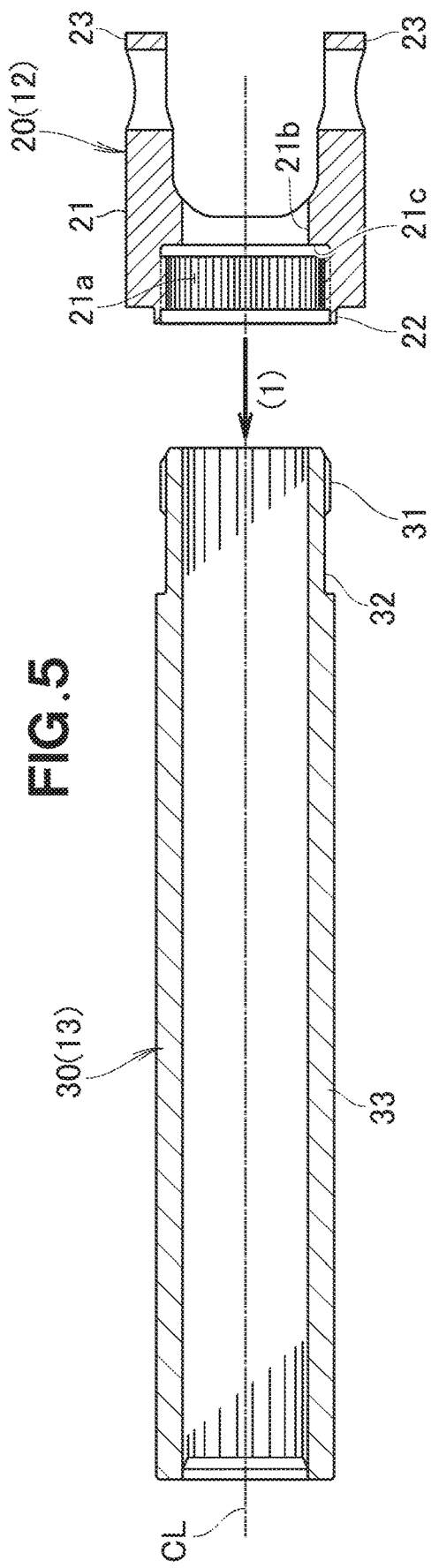

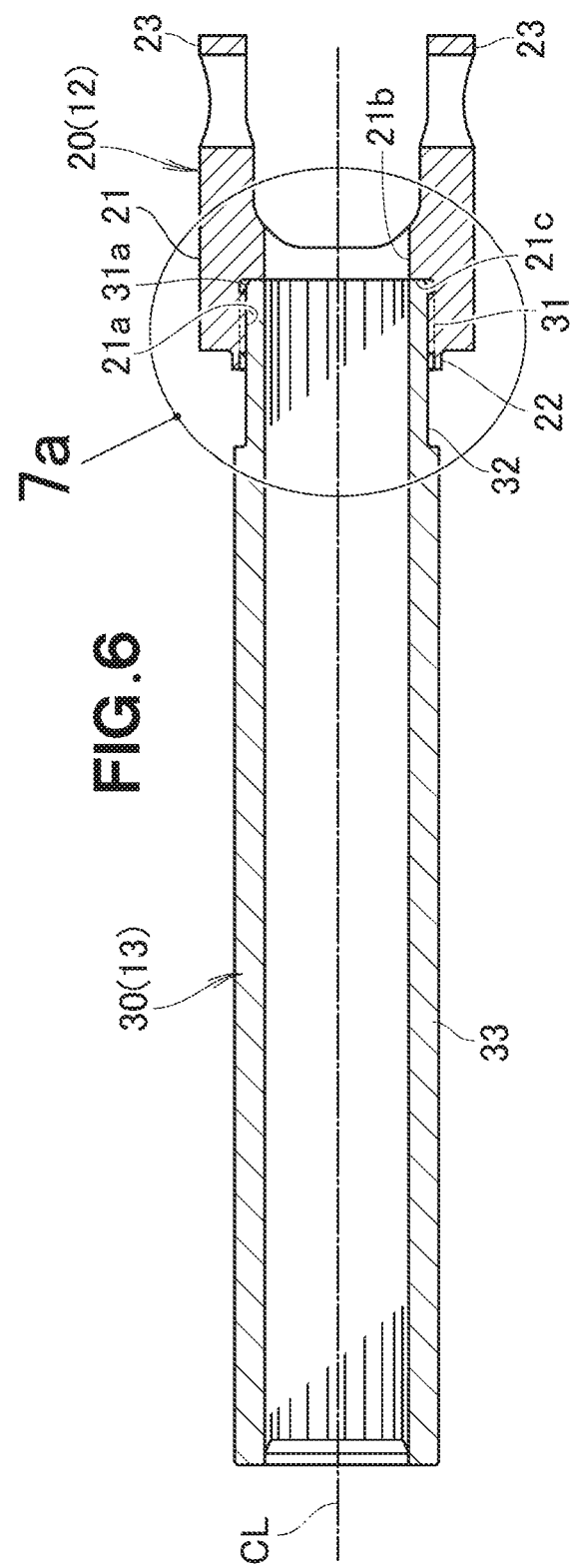

ASSEMBLY OF SHAFT AND YOKE

FIELD OF THE INVENTION

The present invention relates to techniques for manufacturing an assembly of a shaft and a yoke.

BACKGROUND OF THE INVENTION

In a typical vehicle, a steering shaft extends from a steering wheel toward the front in order to transmit a steering torque of the steering wheel to wheels. For example, the steering shaft includes a shaft and a yoke fixed to a front end (leading end) portion of the shaft and partially constituting a coupling. The technique disclosed in Japanese Patent Application Laid-Open Publication No. H3-248727 is one of the conventional techniques pertaining to such an assembly of a shaft and a yoke.

In the assembly of the shaft and the yoke disclosed in Japanese Patent Application Laid-Open Publication No. H3-248727, the yoke is plugged on an end portion of the shaft. The end portion of the shaft penetrates through a main body of the yoke and faces the space between the arm portions of the yoke. The end portion of the shaft is caulked so as to expand toward the outer periphery. Caulking the end portion of the shaft prevents the yoke and the shaft from becoming disengaged from each other.

SUMMARY OF THE INVENTION

In the case of the assembly of the shaft and the yoke disclosed in Japanese Patent Application Laid-Open Publication No. H3-248727, if the diameter of the shaft is increased to be able to withstand a greater load, the size of the yoke increases to secure a space for caulking, which leads to an increased weight and an increased size of the steering device as a whole. In addition, an increase in the size of the shaft and the yoke necessitates a structure for preventing interference with other components, which leads to a decreased design flexibility.

An object of the present invention is to provide an assembly of a shaft and a yoke that can increase the coupling strength between the yoke and the shaft with a simple structure and can decrease the size of the yoke.

According to one aspect of the present invention, there is provided an assembly of a shaft and a yoke. The assembly includes a shaft and a yoke fixed to a front end of the shaft. The yoke constitutes a part of a coupling.

The front end of the shaft is a large-diameter portion having a larger diameter than an adjacent portion.

The yoke includes a yoke main body portion, a thin portion, and two arm portions. The yoke main body portion is substantially cylindrical in shape and is plugged on the large-diameter portion. The thin portion extends from the yoke main body portion along the shaft and is thinner than the yoke main body portion. The two arm portions extend along an axial line from the yoke main body portion in a direction away from the shaft, and face each other.

The yoke main body portion includes a yoke general-diameter portion and a step portion. The yoke general-diameter portion has an inner diameter substantially equal to an outer diameter of the large-diameter portion, and the step portion extends from the end of the yoke general-diameter portion toward the axial line and has an inner diameter smaller than the outer diameter of the large-diameter portion.

The step portion abuts the front end of the large-diameter portion.

The thin portion includes reduced-radius portions at which a diameter of the thin portion across the axial line is smaller than the outer diameter of at least the large-diameter portion.

According to the present invention, the yoke includes the thin portion that extends along the shaft from the yoke main body portion and that is thinner than the yoke main body portion. The thin portion includes the reduced-radius portions at which the diameter of the thin portion is smaller than the outer diameter of at least the large-diameter portion. As the root portion of the yoke has a reduced diameter toward the shaft, the yoke and the shaft are prevented from becoming disengaged from each other. The shaft needs to penetrate through the yoke main body portion when the front end of the shaft is to be caulked, and the gap between the two arm portions needs to be greater than the outer diameter of the shaft. Consequently, if the diameter of the shaft is to be increased, the size of the yoke also needs to be increased. In this respect, according to the present invention, the shaft need not penetrate through the yoke main body portion. Therefore, the gap between the two arm portions can be smaller than the outer diameter of the shaft. This reduces the size of the yoke.

In addition, the yoke includes the step portion formed inside the yoke main body portion. The step portion abuts the front end of the large-diameter portion. The yoke is attached to the shaft at an accurate position.

BRIEF DESCRIPTION OF THE DRAWINGS

Hereinafter, several exemplary embodiments of the present invention will be described in detail with reference to the appended drawings, in which

FIG. 5 is a view useful to describe a press-fitting process of press-fitting the yoke onto the shaft illustrated in FIG. 2;

FIG. 6 is a view useful to describe the shaft on which the yoke illustrated in FIG. 5 is press-fitted;

DETAILED DESCRIPTION OF THE PREFERRED EMBODIMENTS

Figure 1:
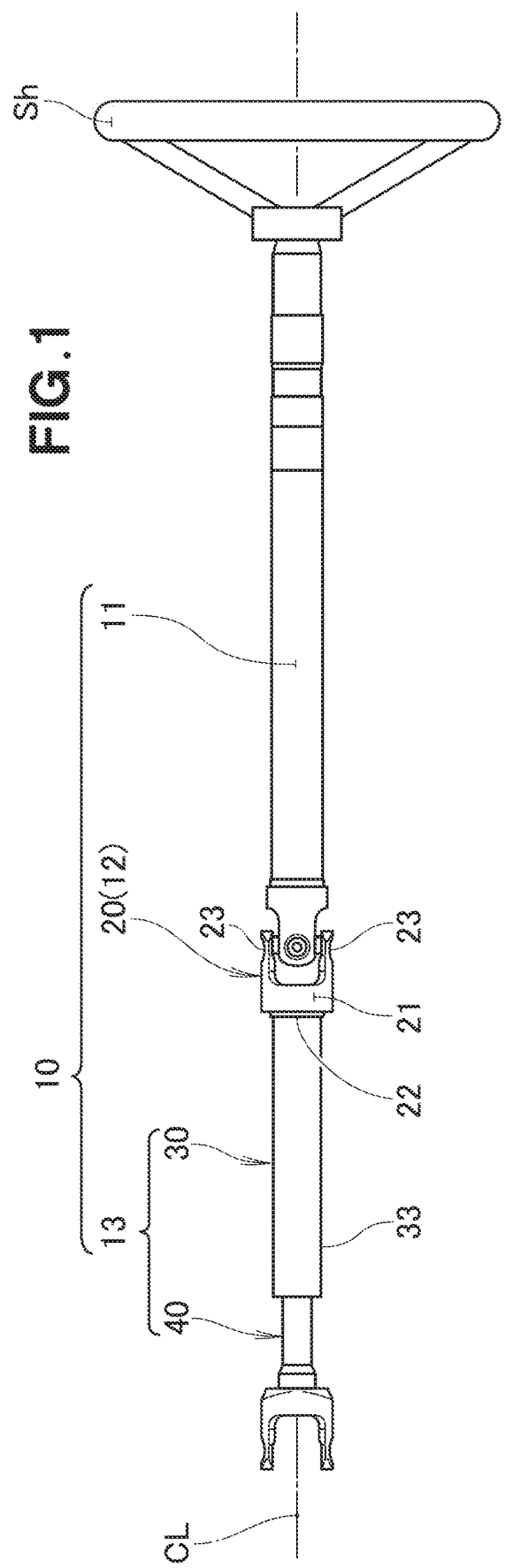
FIG. 1 is a side view of a steering shaft that includes an assembly of a shaft and a yoke according to an embodiment of the present invention.

Embodiments of the present invention will be described hereinafter with reference to the appended drawings. In the following description, the terms "right" and "left" indicate the right and the left in the drawings, and the terms "up" and "down" indicates the up side and the down side in the drawings.

Embodiments

Referring to FIG. 1, illustrated is a steering shaft to which a steering wheel is attached. The steering shaft 10 has an upper shaft 11 and a lower shaft 13. A steering wheel Sh is attached to one end of the upper shaft 11, and the lower shaft 13 is connected to the upper shaft 11 via a universal joint coupling 12.

The lower shaft 13 has an outer shaft 30 (shaft 30) and an inner shaft 40. A yoke 20, which constitutes a part of the universal joint coupling 12, is fixed to one end of the outer shaft 30, and the inner shaft 40 is disposed inside the outer shaft 30 and can move along an axial line CL of the outer shaft 30.

Figure 2:
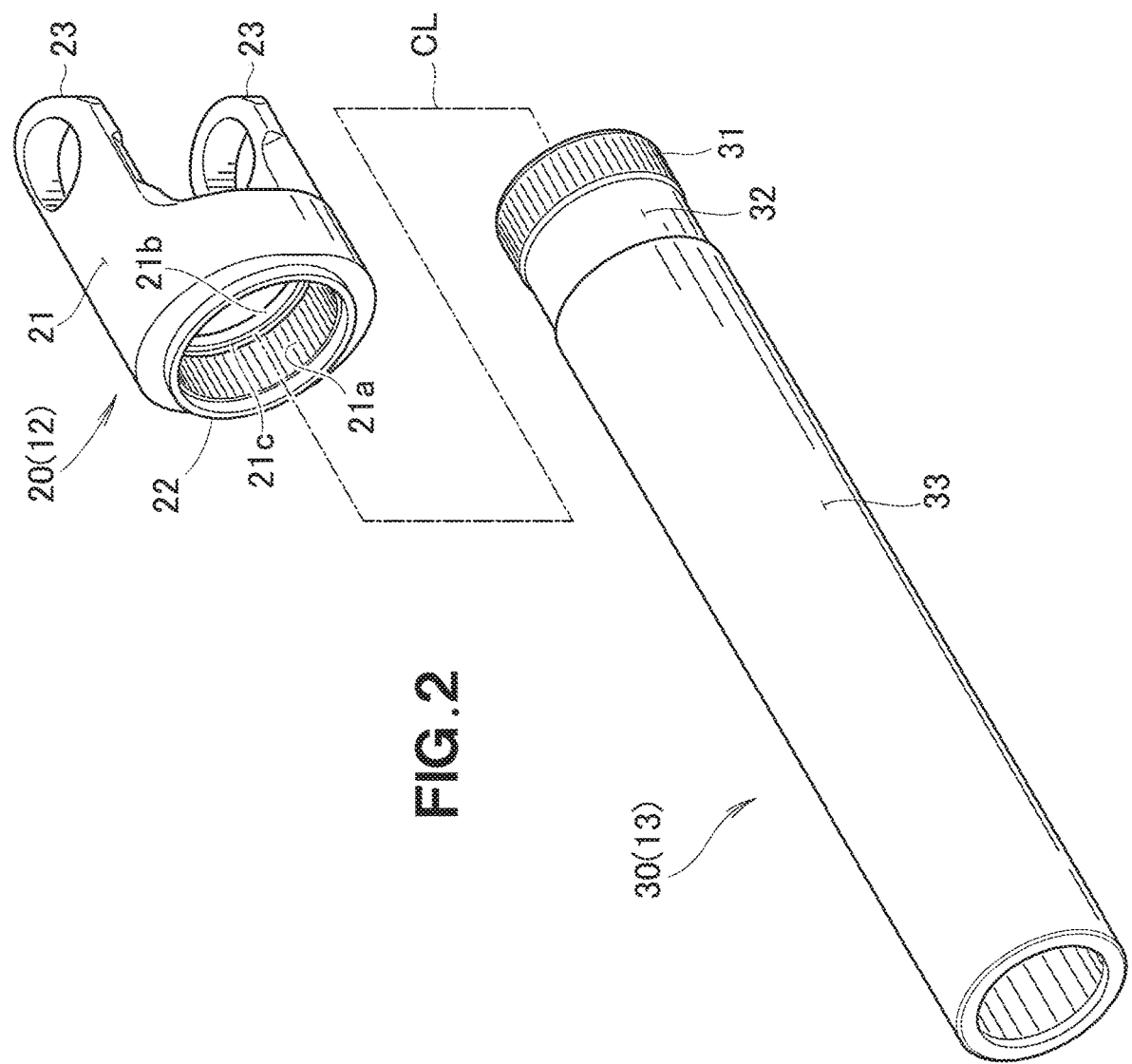
FIG. 2 is an exploded perspective view of the shaft and the yoke illustrated in FIG. 1.
Figure 3:
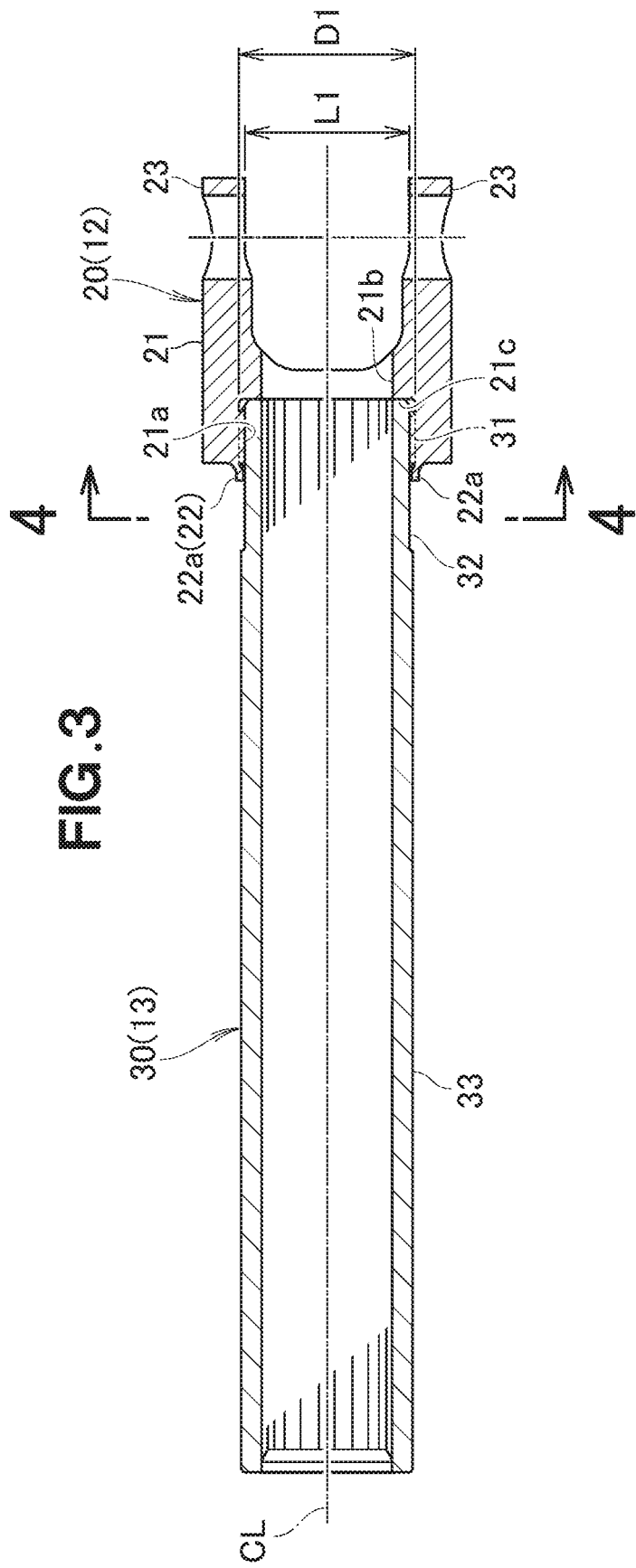
FIG. 3 is a cross-sectional view of the assembly of the shaft and the yoke illustrated in FIG. 1.

Referring to FIG. 2 and FIG. 3, the outer shaft 30 is a cylindrical member made of aluminum or an aluminum alloy. The entire inner peripheral surface of the outer shaft 30 is formed in a female spline shape. The outer shaft 30 supports the inner shaft 40 (see FIG. 1) having an outer peripheral surface formed into a male spline shape such that the inner shaft 40 can slide but cannot rotate in the outer shaft 30. That the inner shaft 40 cannot rotate in the outer shaft 30 means that the inner shaft 40 cannot rotate relative to the outer shaft 30.

The outer shaft 30 includes a serrated large-diameter portion 31, a shaft small-diameter portion 32, and a shaft main body portion 33. The shaft small-diameter portion 32 is continuous with the large-diameter portion 31 and has a smaller outer diameter than the large-diameter portion 31, and the shaft main body portion 33 is continuous with the shaft small-diameter portion 32 and has a slightly larger outer diameter than the large-diameter portion 31.

The outer diameter of the large-diameter portion 31 may be substantially equal to the outer diameter of the shaft main body portion 33. Furthermore, the outer shaft 30 need not include the shaft small-diameter portion 32. In this case, the shaft main body portion 33 is continuous with an end portion of the large-diameter portion 31, and the large-diameter portion 31 has a larger outer diameter than the outer diameter of the shaft main body portion 33.

The yoke 20 is made of aluminum or an aluminum alloy. The yoke 20 includes a yoke main body portion 21, a thin portion 22, and two arm portions 23 and 23. The yoke main body portion 21 is substantially cylindrical in shape and is plugged on the large-diameter portion 31 of the outer shaft 30. The thin portion 22 extends from the yoke main body portion 21 toward the outer shaft 30 and is thinner than the yoke main body portion 21. The two arm portions 23 and 23 extend along the axial line CL from the yoke main body portion 21 in a direction away from the outer shaft 30 and face each other.

The inner periphery of the yoke main body portion 21 includes a yoke general-diameter portion 21a, a yoke small-diameter portion 21b, and a step portion 21c. The yoke general-diameter portion 21a has an inner diameter substantially equal to the outer diameter of the large-diameter portion 31 of the outer shaft 30. The yoke small-diameter portion 21b is a cylindrical aperture adjacent to the yoke general-diameter portion 21a on the side toward the arm portions 23 and 23. The step portion 21c is formed in a boundary portion between the yoke general-diameter portion 21a and the yoke small-diameter portion 21b.

The yoke general-diameter portion 21a is serrated. The yoke general-diameter portion 21a has a larger inner diameter than the yoke small-diameter portion 21b.

The step portion 21c extends toward the axial line CL from the end portion of the yoke general-diameter portion 21a on the side of the arm portions 23 and 23. The step portion 21c abuts the front end of the large-diameter portion 31.

Figure 4:
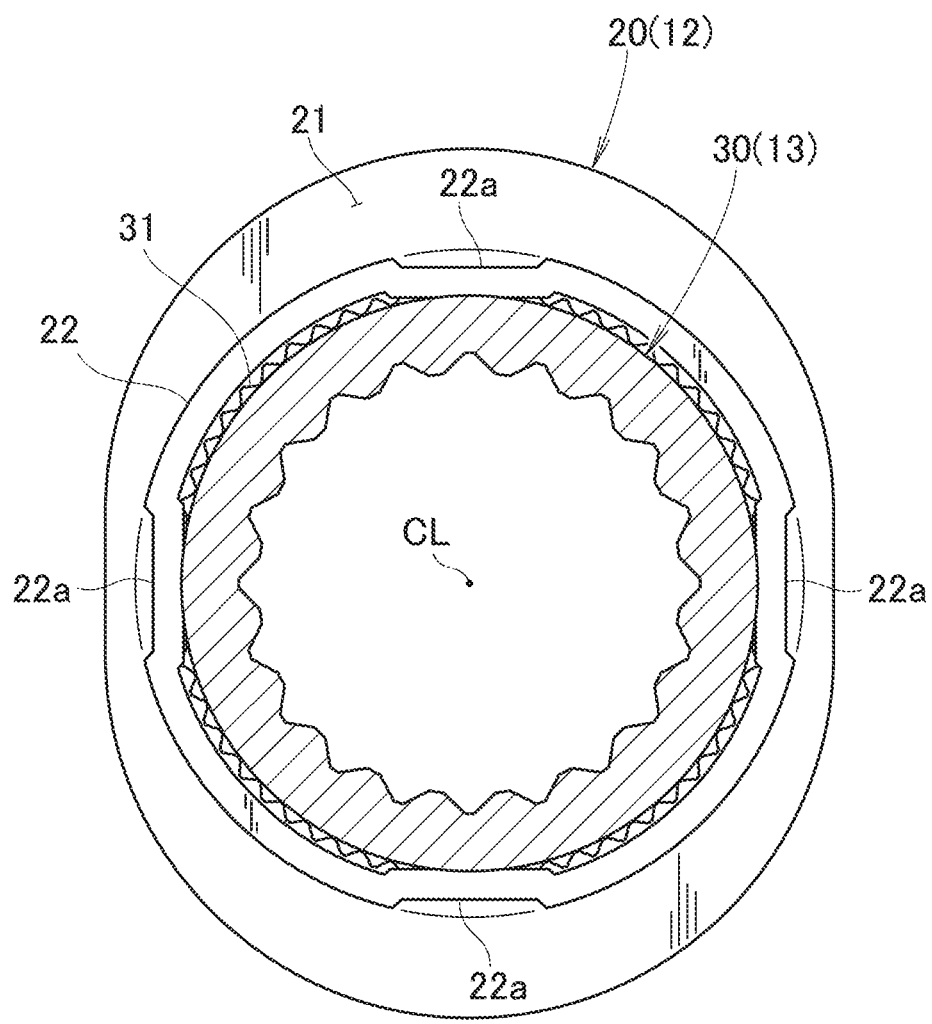
FIG. 4 is a cross-sectional view taken along the line 4-4 in FIG. 3.

Referring to FIG. 4, the thin portion 22 has reduced radii at four locations thereof arranged at approximately 90-degree interval, and these four locations are each curved inward toward the outer shaft 30. These four locations constitute reduced-radius portions 22a at which the radii are reduced by caulking.

Referring to FIG. 3, the diameter of the thin portion 22 at the reduced-radius portions 22a across the axial line CL is smaller than the outer diameter of the large-diameter portion 31 with respect to the circumferential direction of the outer shaft 30. In addition, the reduced-radius portions 22a may abut the shaft small-diameter portion 32.

FIG. 5 and subsequent drawings illustrate a method of attaching the yoke 20 to the outer shaft 30.

Referring to FIG. 5, the yoke 20 is press-fitted onto the large-diameter portion 31 of the outer shaft 30, as indicated by the arrow (1). Alternatively, the outer shaft 30 may be press-fitted into the yoke 20. The diameter of the large-diameter portion 31 decreases toward the front end. This can facilitate the press-fitting process.

Referring to FIG. 6, the press fitting is performed until the front end of the large-diameter portion 31 of the outer shaft 30 comes into contact with the step portion 21c of the yoke 20. The large-diameter portion 31 of the outer shaft 30 and the yoke general-diameter portion 21a of the yoke 20 are both serrated, and therefore it is possible to firmly fix the yoke 20 onto the front end of the outer shaft 30.

Figure 7A:
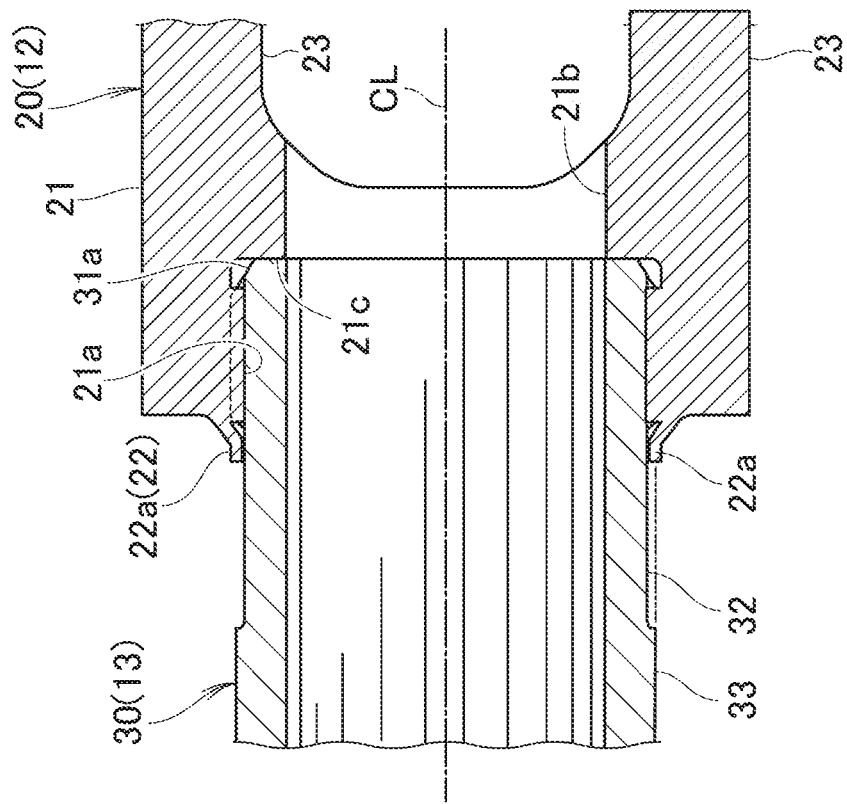
FIG. 7A is a view useful to describe a caulking process of caulking a thin portion illustrated in FIG. 6.

Referring to FIG. 7A, at least a portion of the thin portion 22 is caulked toward the axial line CL, as indicated by the arrows (2).

Figure 7B:
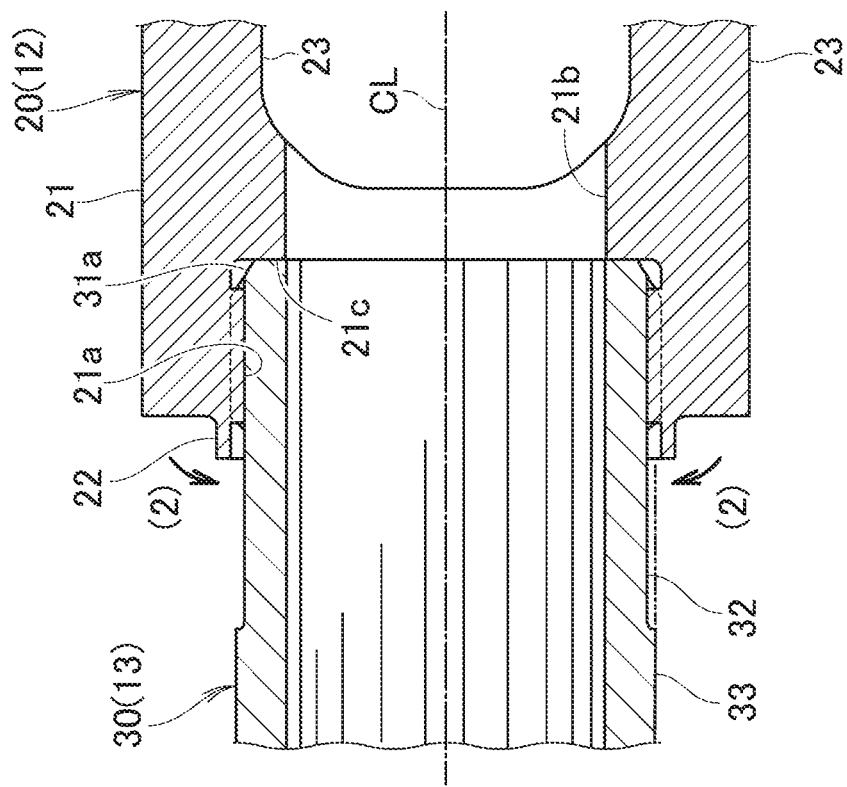
FIG. 7B is a view useful to describe the state in which the thin portion illustrated in FIG. 7A is caulked.

Referring to FIG. 7B, this caulking of the thin portion 22 leads to the formation of the reduced-radius portions 22a at which the thin portion 22 has a diameter smaller than the outer diameter of the large-diameter portion 31 of the outer shaft 30. Thus, assembling of the shaft and the yoke is completed.

Figure 8B:
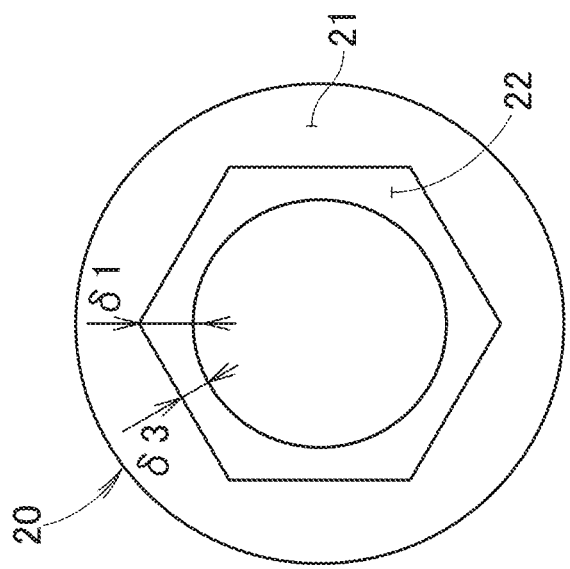
FIG. 8B is a bottom view of a yoke used in a second modification example of the present invention.
Figure 8A:
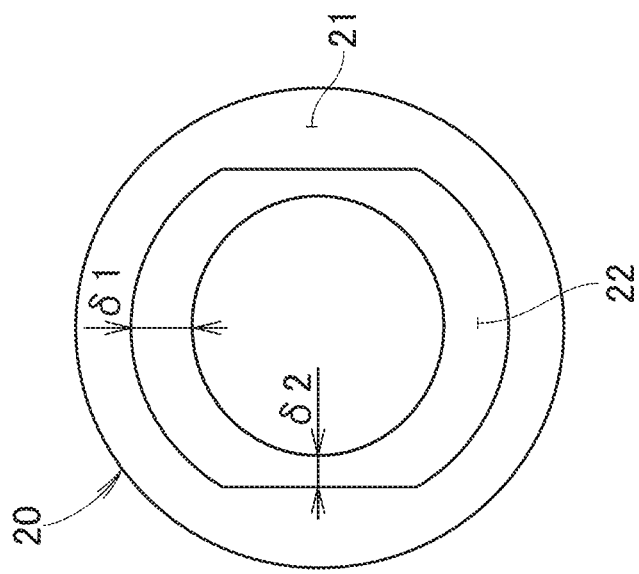
FIG. 8A is a bottom view of a yoke used in a first modification example of the present invention.

Referring to FIG. 8A and FIG. 8B, the thin portion 22 need not be cylindrical in shape nor have a uniform thickness therethroughout. For example, as illustrated in FIG. 8A, the thin portion 22 may have an obround-like shape with two flat sides parallel to each other, and thinner portions (see $\delta 2$) that are thinner than the general portions of the thin portion 22 having a thickness of $\delta 1$ may be formed. In FIG. 8B, the thin portion 22 is formed into a hexagon, and thinner portions (se $\delta 3$) may be formed. The thinner portions can easily be caulked, and the reduced-radius portions 22a (see FIG. 3) can easily be formed. As the remaining portions (general portions) of the thin portion 22 excluding the reduced-radius portions 22a are thicker than the reduced-radius portions 22a, the strength of the thin portion 22 can be ensured.

The above-described embodiments of the present invention provide the following advantageous effects.

Referring to FIG. 3, the yoke 20 includes the thin portion 22 that extends along the outer shaft 30 from the yoke main body portion 21 and is thinner than the yoke main body portion 21. The thin portion 22 includes the reduced-radius portions 22a at which the thin portion 22 has a diameter smaller than the outer diameter of at least the large-diameter portion 31 of the outer shaft 30. When a load is exerted in the direction in which the yoke 20 and the outer shaft 30 come off each other, the reduced-radius portions 22a come into contact with the large-diameter portion 31, and a load for deforming the reduced-radius portions 22a is produced.

This deformation load prevents the yoke 20 and the outer shaft 30 from coming off each other, and the yoke 20 and the outer shaft 30 are prevented from becoming disengaged from each other. The loosening load can be adjusted by varying the radius reducing positions on the reduced-radius portions 22a. For example, the loosening load can be increased by caulking and bending the reduced-radius portions 22a until the reduced-radius portions 22a abut the shaft small-diameter portion 32. This results in further rigid coupling. In addition, according to the embodiments of the present invention, the outer shaft 30 need not penetrate through the yoke main body portion 21. Therefore, the distance L1 between the two arm portions 23 and 23 can be smaller than the outer diameter D1 of the outer shaft 30. This allows for a reduction in the size of the yoke 20.

The yoke 20 includes the step portion 21c formed inside the yoke main body portion 21. The step portion 21c abuts the front end of the large-diameter portion 31 of the outer shaft 30. The yoke 20 can be press-fitted onto the outer shaft 30 at an accurate position.

Furthermore, the shaft small-diameter portion 32 having the smallest outer diameter is adjacent to the large-diameter portion 31. As the shaft small-diameter portion 32 is formed, a portion adjacent to the shaft small-diameter portion 32 has a large diameter relative to the diameter of the shaft small-diameter portion 32. Thus, the large-diameter portion 31 can be formed with ease.

In addition, forming the shaft small-diameter portion 32 allows for an increase in the lapping amount between the thin portion 22 and the large-diameter portion 31 without increasing the diameter of the large-diameter portion 31. As the lapping amount is increased, it is possible to prevent the yoke 20 from coming off the outer shaft 30 in a more reliable manner. In other words, the coupling strength between the yoke 20 and the outer shaft 30 can be enhanced. Furthermore, the coupling strength between the yoke 20 and the outer shaft 30 can be adjusted through the setting of the lapping amount between the thin portion 22 and the large-diameter portion 31.

Furthermore, the yoke 20 and the outer shaft 30 are made of aluminum or an aluminum alloy. The thin portion 22 is formed in the yoke 20, and the thin portion 22 is made to have a diameter smaller than the outer diameter of at least the large-diameter portion 31 to form the reduced-radius portions 22a. The outer shaft 30 and the yoke 20 can be prevented properly from coming off each other even when the outer shaft 30 and the yoke 20 are made of aluminum or an aluminum alloy having a smaller deformation amount than steel.

In particular, when the front end of the shaft is caulked in a direction in which the diameter increases, the front end of the shaft deforms to a great extent. Although such caulking can be employed if steel is used, when aluminum or an aluminum alloy, which can be less elongated than steel, is used, it is conceivable that aluminum or an aluminum alloy cannot be deformed by a necessary amount. In this respect, according to the embodiments of the present invention, the thin portion 22 of the yoke 20 is curved to positions that overlap at least the large-diameter portion 31 to form the reduced-radius portions 22a. Thus, even when aluminum or an aluminum alloy, which can be less elongated than steel, is used as the material for the yoke 20, it is possible to reliably couple the yoke 20 and the outer shaft 30 with each other. Employing aluminum or an aluminum alloy allows for a reduction in the weight of the assembly of the shaft and the yoke. In other words, when aluminum or an aluminum alloy is employed as the material for the yoke 20 and the outer shaft 30, the yoke 20 and the outer shaft 30 can be coupled to each other reliably, and the weight of the assembly can be reduced.

Although the assembly of the shaft and the yoke according to the present invention has been described with the lower shaft of the steering shaft, the present invention can also be applied to the upper shaft 11 and so on of the steering shaft 10. The present invention can further be applied to other parts and components. Although the yoke and the shaft made of aluminum or an aluminum alloy have been described, the present invention can also be applied to a yoke and a shaft made of steel. In other words, the present invention is not limited to the embodiments as long as the functions and the advantageous effects of the present invention can be obtained.

INDUSTRIAL APPLICABILITY

The assembly of the shaft and the yoke according to the present invention is suitable for a steering shaft of a vehicle.

REFERENCE NUMERALS

12: Universal joint coupling (coupling)
20: Yoke
21: Yoke main body portion
21a: Yoke general-diameter portion
21c: Step portion
22: Thin portion
22a: Reduced-radius portion
23: Arm portion
30: Outer shaft (shaft)
31: Large-diameter portion
CL: Axial line

What is claimed is:

1. An assembly of a shaft and a yoke, the assembly comprising:
   a shaft; and
   a yoke fixed to a front end of the shaft and constituting a part of a coupling,
   the front end of the shaft constituting a large-diameter portion, said large-diameter portion having a diameter that is larger than a diameter of an adjacent portion,
   the yoke including a yoke main body portion, a thin portion, and two arm portions, the yoke main body portion being substantially cylindrical in shape and being plugged on the large-diameter portion of the front end of the shaft, the thin portion extending from the yoke main body portion along the shaft and being thinner than the yoke main body portion, the two arm portions facing each other and extending along an axial line from the yoke main body portion in a direction away from the shaft,
   the yoke main body portion including a yoke general-diameter portion and a step portion, the yoke general-diameter portion having an inner diameter substantially equal to an outer diameter of the large-diameter portion, the step portion extending from an end portion of the yoke general-diameter portion toward the axial line and having an inner diameter that is smaller than the outer diameter of the large-diameter portion,
   the step portion abutting a front end of the large-diameter portion,
   the thin portion including reduced-radius portions at which a diameter of the thin portion across the axial line is smaller than the outer diameter of at least the large-diameter portion, wherein the outer diameter of the large-diameter portion is greater than a gap between the two arm portions.

2. The assembly of the shaft and the yoke according to claim 1, wherein a base end of the shaft constitutes a shaft main body portion, and a small-diameter portion having the smallest outer diameter is formed between the large-diameter portion and the shaft main body portion.

3. The assembly of the shaft and the yoke according to claim 2, wherein the outer diameter of the large-diameter portion is substantially equal to an outer diameter of the shaft main body portion.

4. The assembly of the shaft and the yoke according to claim 1, wherein the shaft and the yoke are made of aluminum or an aluminum alloy.

5. The assembly of the shaft and the yoke according to claim 1, wherein the reduced-radius portions are formed to oppose each other across the axial line.

* * * * *